United States Patent [19]
Tsuzuki et al.

[11] Patent Number: 6,086,267
[45] Date of Patent: Jul. 11, 2000

[54] QUANTITY-OF-LIGHT ADJUSTING DEVICE USING BASE AND BLADE APERTURES FOR LIGHT QUALITY CONTROL

[75] Inventors: Masahiko Tsuzuki, Kawaguchi; Toshiaki Kawanishi, Yokohama; Youichi Iwasaki, Yokohama; Hidetomo Tanaka, Yokohama, all of Japan

[73] Assignee: Canon Kabushiki Kaisha, Tokyo, Japan

[21] Appl. No.: 09/265,258

[22] Filed: Mar. 9, 1999

Related U.S. Application Data

[63] Continuation-in-part of application No. 09/166,631, Oct. 5, 1998, abandoned.

[30] Foreign Application Priority Data

Oct. 9, 1997 [JP] Japan ................................. 9-277003
Dec. 25, 1997 [JP] Japan ................................. 9-357851
Jul. 23, 1998 [JP] Japan ................................. 10-208097

[51] Int. Cl.$^7$ .................................................. G03B 17/24
[52] U.S. Cl. ............................ 396/459; 396/505; 396/508
[58] Field of Search ................................. 396/452, 458, 396/459, 460, 463, 493, 494, 505, 507, 508, 449

[56] References Cited

U.S. PATENT DOCUMENTS 2,887,028 5/1959 Eburn, Jr. ................................. 396/459
5,337,110 8/1994 Dowe ........................................ 396/449

*Primary Examiner*—David M. Gray
*Attorney, Agent, or Firm*—Robin, Blecker & Daley

[57] ABSTRACT

A quantity-of-light adjusting device includes a drive source, a base member having an opening formed therein, and a blade arranged to move by being driven by the drive source and having three openings formed therein side by side in a row in a moving direction of the blade, wherein, among the three openings formed in the blade, the opening situated in the middle of the row is larger than the opening formed in the base member.

12 Claims, 13 Drawing Sheets

FIG.2(A)
-B PHASE ENERGIZED;
SMALL-APERTURE POSITION
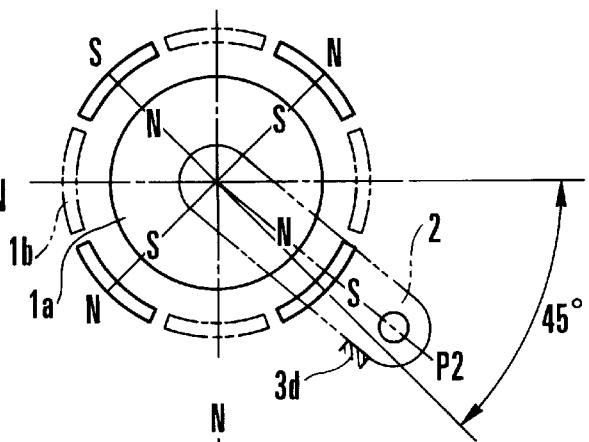
FIG.2(B)
A PHASE ENERGIZED;
FULL-APERTURE POSITION
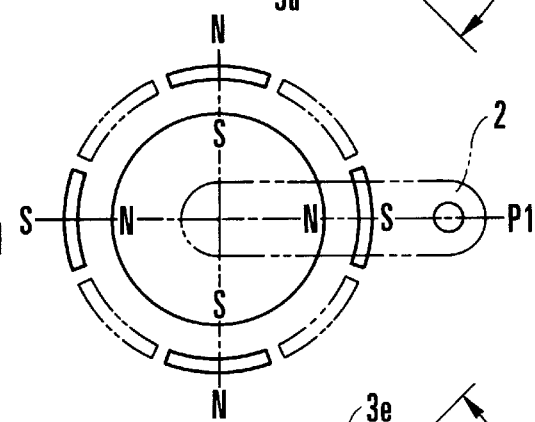
FIG.2(C)
B PHASE ENERGIZED;
FILTER POSITION
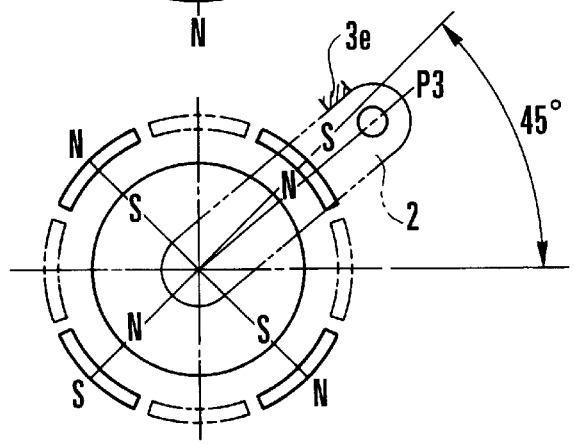
FIG.2(D)
| TERMINALS | FULL APERTURE (P1) | SMALL APERTURE (P2) | FILTER (P3) |
|---|---|---|---|
| A | High | Low | Low |
| -A | Low | Low | Low |
| B | Low | Low | High |
| -B | Low | High | Low |

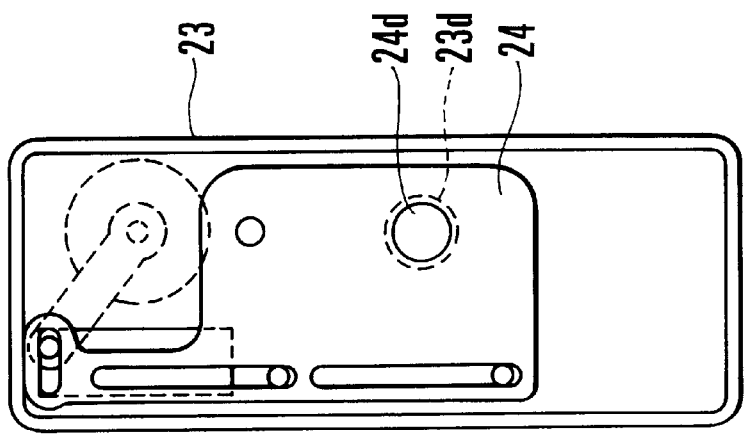
FIG.5(C) FULL-APERTURE POSITION
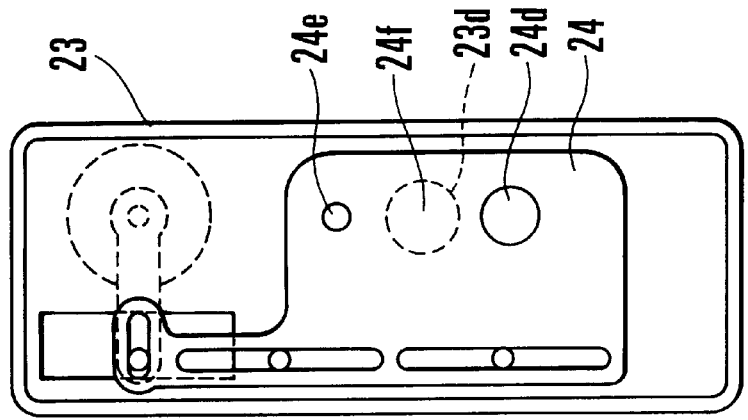
FIG.5(B) FULL-CLOSED POSITION
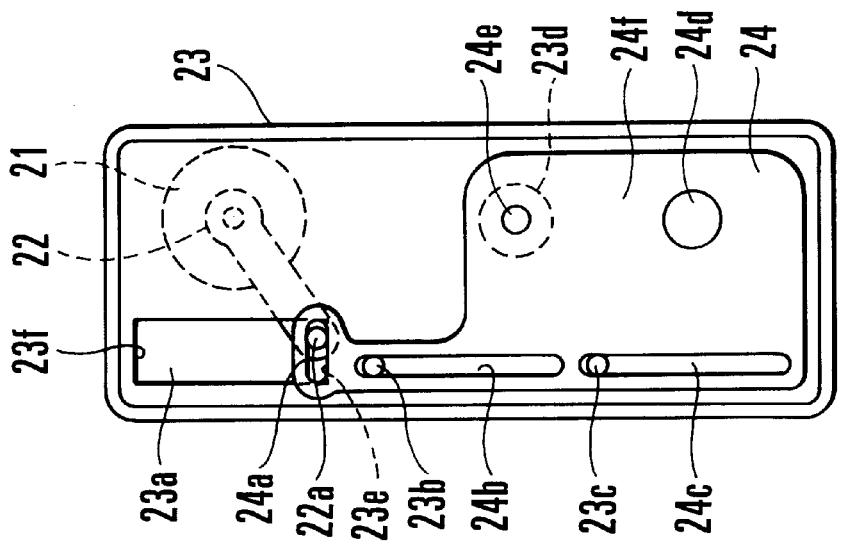
FIG.5(A) SMALL-APERTURE POSITION FIG. 6(A)
-B PHASE ENERGIZED;
FULL-APERTURE POSITION
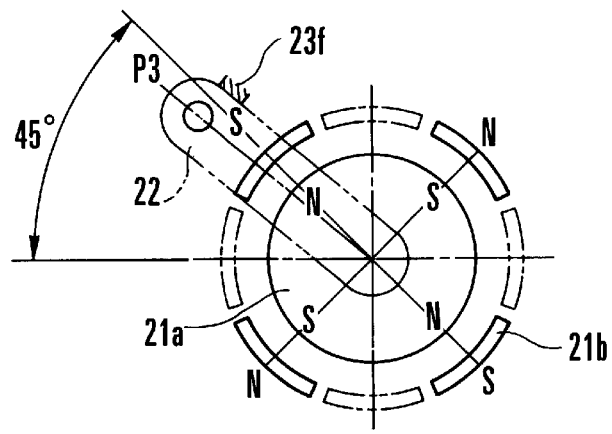
FIG. 6(B)
A PHASE ENERGIZED;
FULL-CLOSED POSITION
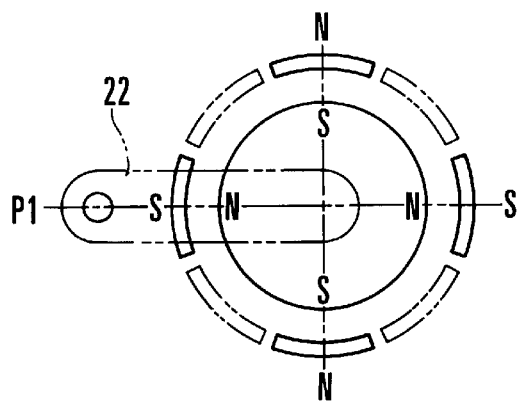
FIG. 6(C)
B PHASE ENERGIZED;
SMALL-APERTURE POSITION
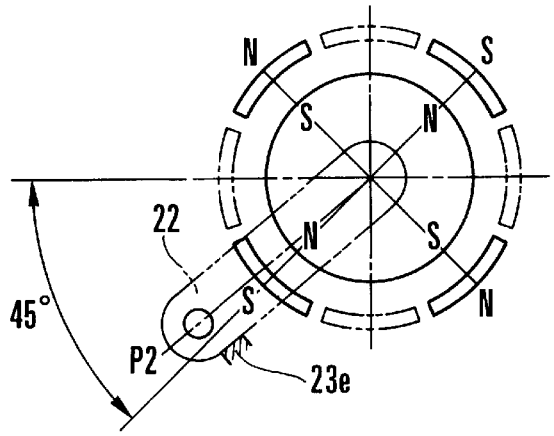
FIG. 6(D)
| TERMINALS | FULL CLOSED (P1) | FULL APERTURE (P3) | SMALL APERTURE (P2) |
|---|---|---|---|
| A | High | Low | Low |
| -A | Low | Low | Low |
| B | Low | Low | High |
| -B | Low | High | Low |

SMALL APERTURE    CLOSED    OPEN

QUANTITY-OF-LIGHT ADJUSTING DEVICE USING BASE AND BLADE APERTURES FOR LIGHT QUALITY CONTROL

This application is a continuation-in-part of U.S. application Ser. No. 09/166,631, filed Oct. 5, 1998 now abandoned.

BACKGROUND OF THE INVENTION

1. Field of the Invention

The present invention relates to a quantity-of-light adjusting device for use in a video camera, a digital still camera or the like.

2. Description of Relates Art

For motion-image taking cameras such as video cameras, there is used a motion-image quantity-of-light adjusting device which continuously varies a diaphragm aperture from a full-aperture state up to a full-closed state. On the other hand, for still-image taking cameras such as digital still cameras, there is used a still-image quantity-of-light adjusting device which switches a diaphragm aperture between two positions, i.e., a full-aperture state and a small-aperture state (e.g., F8) or which is capable of performing a shutter action in addition to the quantity-of-light adjusting function.

Further, a quantity-of-light adjusting device which is capable of adjusting a diaphragm aperture to at least three positions by means of a turret diaphragm mechanism is disclosed in, for example, Japanese Laid-Open Utility Model Application No. HEI 3-52725. In this quantity-of-light adjusting device, a mechanical diaphragm mechanism is used to mechanically restrict a diaphragm member to the full-aperture position by means of a torsion spring and this position is changed over to another position by transmitting a driving force of a driving part to the diaphragm member through gears.

BRIEF SUMMARY OF THE INVENTION

In accordance with one aspect of the invention, there is provided a quantity-of-light adjusting device, which comprises a drive source, a base member having an opening formed therein, and a blade arranged to move by being driven by the drive source and having three openings formed therein side by side in a row in a moving direction of the blade, wherein, among the three openings formed in the blade, the opening situated in the middle of the row is larger than the opening formed in the base member.

In accordance with another aspect of the invention, there is provided a quantity-of-light adjusting device, which comprises a drive source, a base member having an opening formed therein, and a blade arranged to move by being driven by the drive source and having two openings formed therein side by side in a row in a moving direction of the blade, wherein, between the two openings formed in the blade, there is provided a light blocking area which is larger than the opening formed in the base member.

These and other aspects and features of the invention will become apparent from the following detailed description of preferred embodiments thereof taken in connection with the accompanying drawings.

BRIEF DESCRIPTION OF THE SEVERAL VIEWS OF THE DRAWING

FIGS. 2(A) to 2(D) are diagrams for explaining the action of a stepping motor included in the quantity-of-light adjusting device according to the first embodiment.

FIGS. 5(A) to 5(C) are plan views showing the mechanical arrangement of a quantity-of-light adjusting device according to a second embodiment of the invention.

FIGS. 6(A) to 6(D) are diagrams for explaining the action of a stepping motor included in the quantity-of-light adjusting device according to the second embodiment.

DETAILED DESCRIPTION OF THE INVENTION

Hereinafter, preferred embodiments of the invention will be described in detail with reference to the drawings.

First Embodiment

Figure 1:
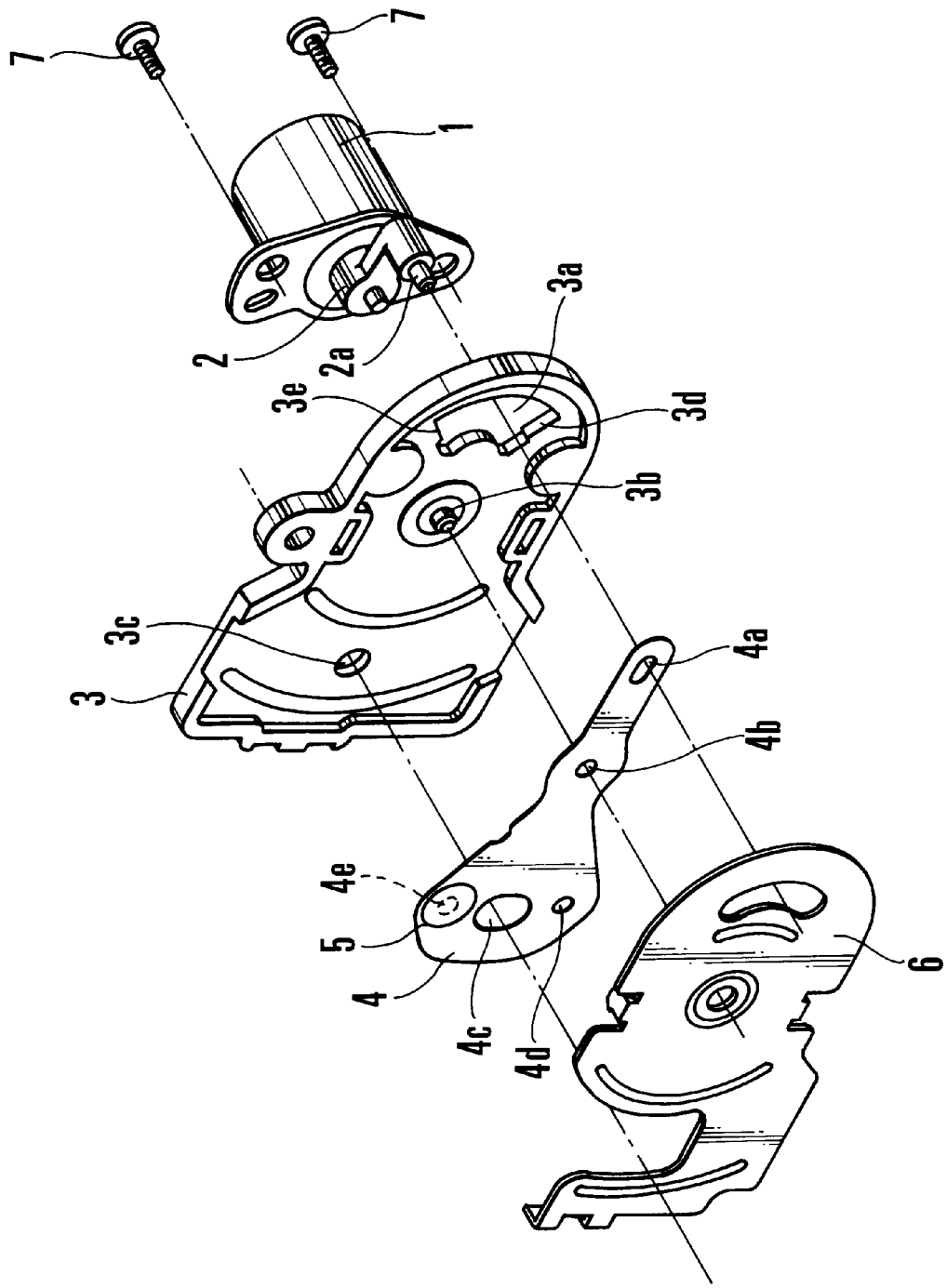
FIG. 1 is an exploded perspective view showing the mechanical arrangement of a quantity-of-light adjusting device according to a first embodiment of the invention.

FIG. 1 shows the mechanical arrangement of a quantity-of-light adjusting device according to a first embodiment of the invention. Referring to FIG. 1, a stepping motor 1 is employed as a drive source. An arm member 2 is arranged to rotate integrally with the output shaft of the stepping motor 1. A diaphragm case 3 is provided with a fixed-aperture opening 3c, which defines an optical full-aperture diameter.

A diaphragm blade 4 is made of a sheet material measuring about 1.0 mm in thickness. The diaphragm blade 4 has a shaft hole 4b, which is rotatably fit on a shaft part 3b provided on the diaphragm case 3. On one side of the diaphragm blade 4 across the shaft hole 4b, there is provided a driving slot 4a, into which a pin 2a formed on the arm member 2 is inserted. On the other side of the diaphragm blade 4 across the shaft hole 4b, there are provided an aperture hole 4c, which is larger in diameter than the fixed-aperture opening 3c, and a first small-aperture hole 4d and a second small-aperture hole 4e, each of which is smaller in diameter than the fixed-aperture opening 3c.

An ND filter 5 is bonded to the diaphragm blade 4 to cover the second small-aperture hole 4e. A blade retainer 6 is secured to the diaphragm case 3, which accommodates the diaphragm blade 4, to prevent the diaphragm blade 4 from coming off from the inside of the diaphragm case 3.

The stepping motor 1 is secured with screws 7 to the outer surface of the diaphragm case 3. The arm member 2 protrudes into the inside of the diaphragm case 3 through a sectorial window part 3a provided in the diaphragm case 3. The pin 2a provided on the fore end of the arm member 2 fits in the driving slot 4a formed in the diaphragm blade 4. When the stepping motor 1 is actuated, therefore, the diaphragm blade 4 is caused to swing on the shaft part 3b upward or downward as viewed in FIG. 1. Accordingly, the diaphragm blade 4 is changed over among a full-aperture position in which the aperture hole 4c coincides, in position in the optical axis direction, with the fixed-aperture opening 3c of the diaphragm case 3, a small-aperture position in which the first small-aperture hole 4d coincides, in position in the optical axis direction, with the fixed-aperture opening 3c, and a filter position in which the second small-aperture hole 4e (the ND filter 5) coincides, in position in the optical axis direction, with the fixed aperture hole 3c.

The diaphragm blade 4 is driven into each of the above-stated positions in the following manner. Referring to FIGS. 2(A) to 2(D), the stepping motor 1 is composed of a rotor magnet 1a which is formed integrally with the output shaft and a stator ring 1b which encompasses the rotor magnet 1a. The stepping motor 1 has eight magnetic stop positions in one round of rotation. In the case of the first embodiment, the stepping motor 1 is driven within the range of three magnetic stop positions which are adjacent to each other among these eight magnetic stop positions.

When the stepping motor 1 comes to a stop at the middle magnetic stop position among the three magnetic stop positions, as shown in FIG. 2(B), that is, when a high level signal is inputted only to an input terminal A among the input terminals A, -A, B and -B, as shown in FIG. 2(D), the diaphragm blade 4 is set at the full-aperture position P1.

However, the magnetic stop position of the stepping motor 1 fluctuates to a certain degree. Hence, if the diameter (size) of the aperture hole 4c is assumed to be the same as that of the fixed-aperture opening 3c, the aperture hole 4c and the fixed-aperture opening 3c tend to deviate from each other due to fluctuations of the magnetic stop position, resulting in the full-aperture diameter varying. To solve this problem, in the first embodiment, the aperture hole 4c is formed in an elliptic shape extending at least in the direction of driving in such a way as to absorb the fluctuations of the magnetic stop position, so that the full-aperture diameter can be always kept constant. In other words, the full-aperture diameter is determined by the fixed-aperture hole 3c of the diaphragm case 3.

Further, stopper faces 3e and 3d are formed at the upper and lower end parts of the sectorial window part 3a of the diaphragm case 3. These stopper faces 3e and 3d are respectively located more inward than the two side magnetic stop positions among the three magnetic stop positions.

Therefore, when a high level signal is inputted only to the input terminal -B of the stepping motor 1, as shown in FIG. 2(D), the arm member 2 is caused to abut on the stopper face 3d by a magnetic force which urges the rotor magnet 1a to rotate toward a lower magnetic stop position, so that the diaphragm blade 4 can be accurately brought to the small-aperture position P2, as shown in FIG. 2(A).

When a high level signal is inputted only to the input terminal B of the stepping motor 1 as shown in FIG. 2(D), the arm member 2 is caused to abut on the stopper face 3e by a magnetic force which urges the rotor magnet 1a to rotate toward an upper magnetic stop position, so that the diaphragm blade 4 can be accurately brought to the filter position P3, as shown in FIG. 2(C).

The arm member 2 and the diaphragm blade 4 are thus pushed against the stopper faces 3d or 3e by the magnetic force of the stepping motor 1 to set the diaphragm blade 4 at the small-aperture position P2 or at the filter position P3. By virtue of this arrangement, the centers of the small-aperture holes 4d and 4e which correspond to the two positions P2 and P3, respectively, can be accurately set without deviating from the optical axis (the center of the fixed-aperture opening 3c) of the quantity-of-light adjusting device.

After the diaphragm blade 4 is moved to any of the above-stated three positions P1, P2 and P3, the diaphragm blade 4 can be kept in that position by the cogging torque of the rotor magnet 1a even after the high level signal inputted to the input terminal A, -A, B or -B is cut off.

Figure 3:
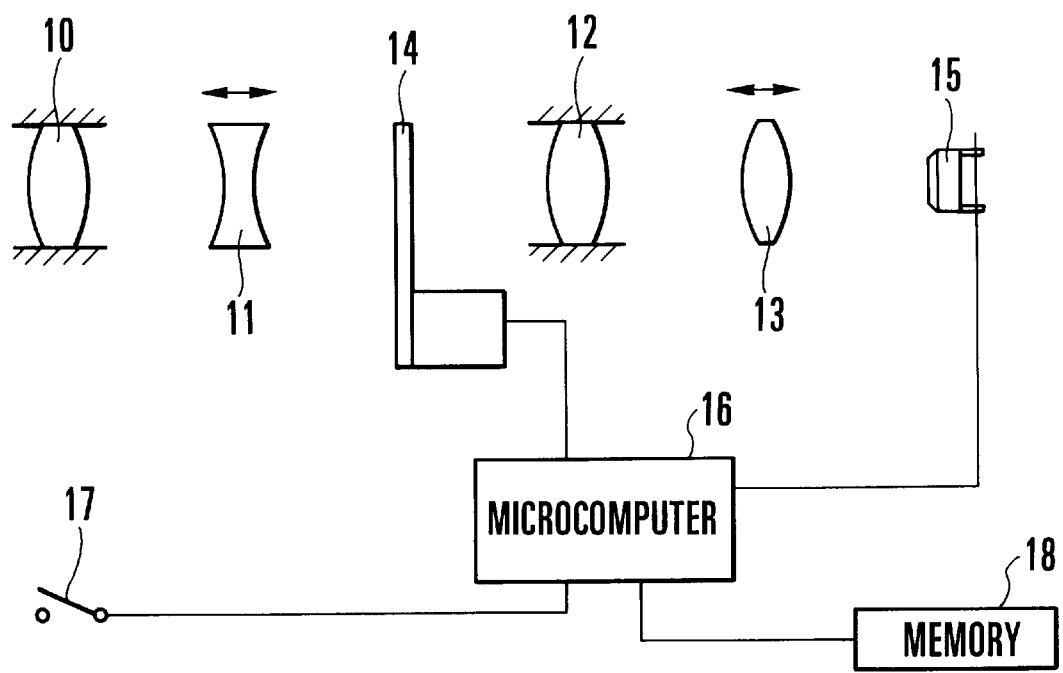
FIG. 3 is a schematic diagram showing the arrangement of a digital camera equipped with the quantity-of-light adjusting device according to the first embodiment.

FIG. 3 shows the arrangement of a digital still camera equipped with the above-stated quantity-of-light adjusting device. In FIG. 3, reference numerals 10 and 12 denote fixed lens groups. Reference numeral 11 denotes a moving lens group provided for varying magnification. Reference numeral 13 denotes a moving lens group provided for focusing. These lens groups constitute an ordinary rear-focus-type lens having a positive-negative-positive-positive refractive power arrangement.

The digital still camera shown in FIG. 3 further includes the quantity-of-light adjusting device 14, an image sensor 15 composed of a CCD, etc., a shutter switch 17, a microcomputer 18, and a memory 18.

Figure 4:
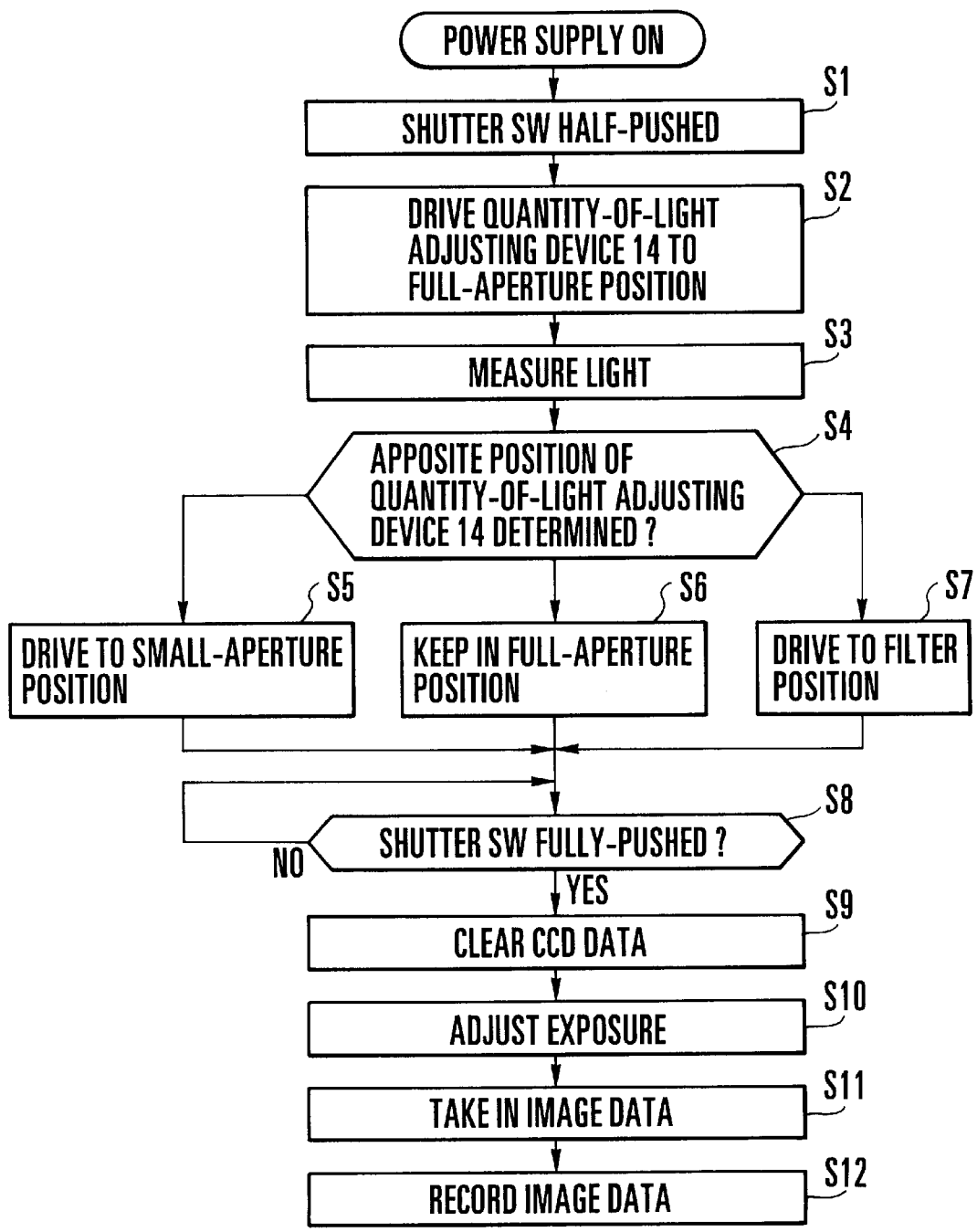
FIG. 4 is a flow chart showing a control operation of the digital camera shown in FIG. 3.

An operation of the microcomputer 16 is next described with reference to FIG. 4 which is a flow chart. When a power supply is turned on by the photographer, the flow of operation begins at a step S1. At the step S1, the shutter switch 17 is pushed halfway, i.e., to the extent of the first stroke. At a step S2, the microcomputer 16 drives the quantity-of-light adjusting device 14 to the full-aperture position. At a step S3, a light measuring action is performed through the image sensor 15 to obtain information on the measured light. At a step S4, a decision is made for a position which is most apposite to photo-taking among the three positions. At a step S5, S6 or S7, the quantity-of-light adjusting device 14 is driven to the position decided.

At a step S8, a check is made to find if the second stroke (full pushing) operation is performed on the shutter switch 17 by the photographer. If so, the flow of operation proceeds to a step S9. At the step S9, the microcomputer 16 clears image data of the image sensor 15 for once. At a step S10, the microcomputer 16 makes adjustment for an optimum exposure in accordance with the gain of a camera circuit, the speed of a digital shutter, etc. At a step S11, image data is accumulated and taken in until the lapse of the optimum exposure time. At a step S12, the image data thus taken in is recorded in the memory 18.

As described above, in the case of the digital still camera which has the CCD 15 arranged to have the electric charge of signals accumulated at a photosensitive part and transferred to a storage part to prevent fogging of light, no mechanical shutter action is necessary.

Second Embodiment

In the case of the first embodiment, the invention is applied to a camera of the kind using an image sensor (CCD). The CCD which is employed as the image sensor has two types. In one type, the CCD has a storage part to which the signal electric charge accumulated at a photosensitive part is transferred. In the other type, the CCD has no such storage part. In the first embodiment, the quantity-of-light adjusting device is used in the camera wherein the CCD is of the former type which obviates the necessity of any mechanical shutter (for a full-closed state). In the case of a second embodiment of the invention, the quantity-of-light adjusting device is used for a camera having a CCD of the latter type which necessitates the use of a mechanical shutter.

FIGS. 5(A) to 5(C) show the arrangement of the quantity-of-light adjusting device according to the second embodiment. Referring to FIGS. 5(A) to 5(C), a stepping motor 21 is employed as a drive source. An arm member 22 is arranged to rotate integrally with the output shaft of the stepping motor 21. A diaphragm case 23 is provided with an opening 23d.

A diaphragm blade 24 is made of a sheet material measuring about 1.0 mm in thickness. The diaphragm blade 24 has guide slots 24b and 24c arranged to be fit on guide pins 23b and 23c provided on the diaphragm case 23. On the upper side of the guide slot 24b in the diaphragm blade 24, there is formed a driving slot 24a. On one side of the guide slots 24b and 24c, there are formed a large-diameter aperture hole 24d and a small-diameter aperture hole 24e. Further, a light blocking part 24f is provided between the large-diameter aperture hole 24d and the small-diameter aperture hole 24e.

The stepping motor 21 is secured to the outer surface of the diaphragm case 23. The arm member 22 protrudes into the inside of the diaphragm case 23 through a square window part 23a formed in the diaphragm case 23. A pin 22a provided at the fore end of the arm member 22 fits in the driving slot 24a of the diaphragm blade 24. Therefore, when the stepping motor 21 is actuated, the diaphragm blade 24 moves upward or downward, as viewed in FIG. 5(A), while being guided by the guide pins 23b and 23c. Accordingly, the diaphragm blade 24 provides a small-aperture position P2 in which the small-diameter aperture hole 24e coincides, in position in the optical axis direction, with the opening 23d of the diaphragm case 23, as shown in FIG. 5(A), a full-closed (fully light-blocked) position P1 in which the light blocking part 24f coincides, in position in the optical axis direction, with the opening 23d, as shown in FIG. 5(B), and a full-aperture position P3 in which the large-diameter aperture hole 24d coincides, in position in the optical axis direction, with the opening 23d, as shown in FIG. 5(C). Further, the opening 23d of the diaphragm case 23 has a larger diameter than the largediameter aperture hole 24d. Therefore, the full-aperture diameter of the quantity-of-light adjusting device is defined by the large-diameter aperture hole 24d and not by the opening 23d formed in the diaphragm case 23.

The diaphragm blade 24 is driven into each of the above-sated positions in the following manner. Referring to FIGS. 6(A) to 6(D), the stepping motor 21 is composed of a rotor magnet 21a which is formed integrally with the output shaft and a stator ring 21b which encompasses the rotor magnet 21a. The stepping motor 21 has eight magnetic stop positions in one round of rotation. In the case of the second embodiment, the stepping motor 21 is driven within the range of three magnetic stop positions which are adjacent to each other among these eight magnetic stop positions.

When the stepping motor 21 comes to a stop at the middle magnetic stop position among the three magnetic stop positions, as shown in FIG. 6(B), that is, when a high level signal is inputted only to an input terminal A among the input terminals A, -A, B and -B, as shown in FIG. 6(D), the diaphragm blade 24 is set at the full-closed position P1. This enables the quantity-of-light adjusting device to function as a mechanical shutter.

Further, stopper faces 23f and 23e are formed at the upper and lower end parts of the sectorial window part 23a of the diaphragm case 23. These stopper faces 23e and 23f are located more inward than the upper-end and lower-end magnetic stop positions among the three magnetic stop positions.

Therefore, when a high level signal is inputted only to the input terminal -B of the stepping motor 21, as shown in FIG. 6(D), the arm member 22 is caused to about on the stopper face 23f by a magnetic force which urges the rotor magnet 21a to rotate toward the upper magnetic stop position in a state of being pushed against the stopper face 23f, so that the diaphragm blade 24 can be accurately brought to the full-aperture position P3, as shown in FIG. 6(A).

When a high level signal is inputted only to the input terminal B of the stepping motor 21 as shown in FIG. 6(D), the arm member 22 is caused to abut on the stopper face 23e by a magnetic force which urges the rotor magnet 21a to rotate toward the lower magnetic stop position in a state of being pushed against the stopper face 23e, so that the diaphragm blade 24 can be accurately brought to the small-aperture position P2, as shown in FIG. 6(C).

The arm member 22 is thus pushed against the stopper faces 23e or 23f by the magnetic force of the stepping motor 21 to set the diaphragm blade 24 at the small-aperture position P2 or at the full-aperture position P3 without any deviation. Therefore, the centers of the aperture holes 24e and 24d which are provided in the diaphragm blade 24 to correspond to the two positions P2 and P3 can be accurately set in position without deviating from the optical axis (the center of the opening 23d) of the quantity-of-light adjusting device.

After the diaphragm blade 24 is moved to any of the above-stated three positions P1, P2 and P3, the diaphragm blade 24 can be kept in that position by the cogging torque of the rotor magnet 21 even after the high level signal inputted to the input terminal A, -A, B or -B is cut off.

The quantity-of-light adjusting device according to the second embodiment is used for a camera which differs only in type of the image sensor from the camera of the first embodiment. In other words, in the second embodiment, the microcomputer 16 controls the quantity-of-light adjusting device, etc., according to an operation performed on the shutter switch 17.

Figure 7:
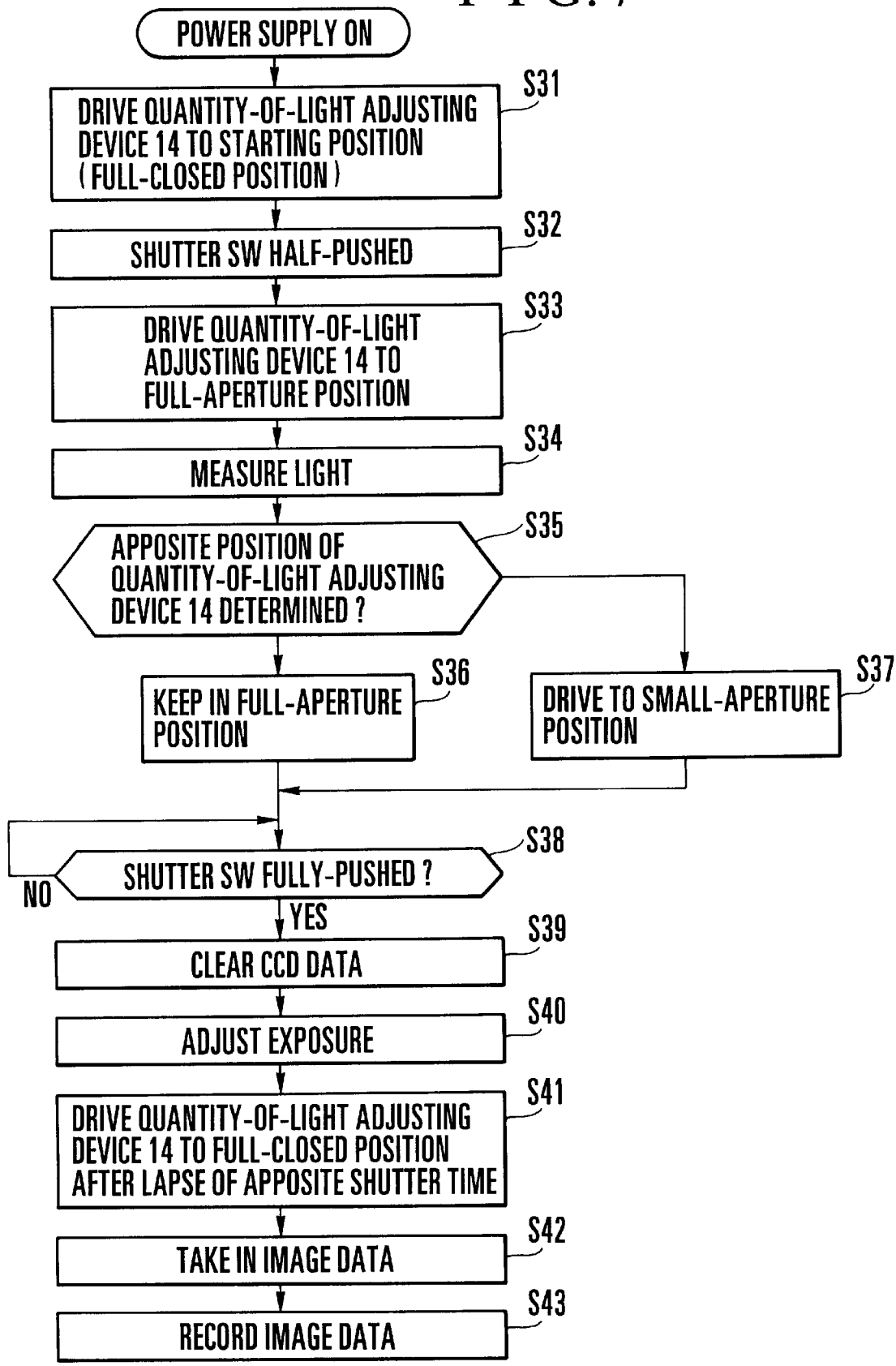
FIG. 7 is a flow chart showing a control operation of a camera equipped with the quantity-of-light adjusting device according to the second embodiment.

An operation of the microcomputer 16 is next described with reference to FIG. 7 which is a flow chart. When the power supply is turned on by the photographer, the flow of operation begins at a step S31. At the step S31, the microcomputer 16 drives the quantity-of-light adjusting device 14 to the full-closed position, thereby bringing the shutter into a closed state. At a step S32, the shutter switch 17 is pushed halfway, i.e., to the extent of the first stroke. At a step S33, the microcomputer 16 drives the quantity-of-light adjusting device 14 to the full-aperture position. At a step S34, a light measuring action is performed through the image sensor 15 to obtain information on the measured light. At a step S35, a decision is made for a position which is most apposite to photo-taking among the two positions (the full-aperture position and the small-aperture position). At a step S36 or S37, the quantity-of-light adjusting device 14 is driven to the position decided, thereby bringing the shutter into an open state.

At a step S38, a check is made to find if the second stroke (full pushing) operation on the shutter switch 17 is performed by the photographer. If so, the flow of operation proceeds to a step S39. At the step S39, the microcomputer 16 clears image data of the image sensor 15 for once. At a step S40, the microcomputer 16 makes adjustment for an optimum exposure in accordance with the gain of a camera circuit, the speed of a digital shutter, etc. At a step S41, after the lapse of time of the optimum exposure, the quantity-of-light adjusting device 14 is brought back to the full-closed position, thereby bringing the shutter to the closed state. At a step S42, with a double exposure being prevented, image data which has been accumulated is taken in. At a step S43, the image data is recorded in the memory 18.

The invention is not limited to the shapes and driving directions of the diaphragm member described in the embodiments. The invention is applicable also to a quantity-of-light adjusting device of such a type having two or four positions (for example, a full-closed position, a full-aperture position, a large-aperture position and a small-aperture position).

Further, the invention is applicable not only to a digital still camera but also to optical apparatuses of various kinds, such as a video camera, etc.

Third Embodiment

Figure 8:
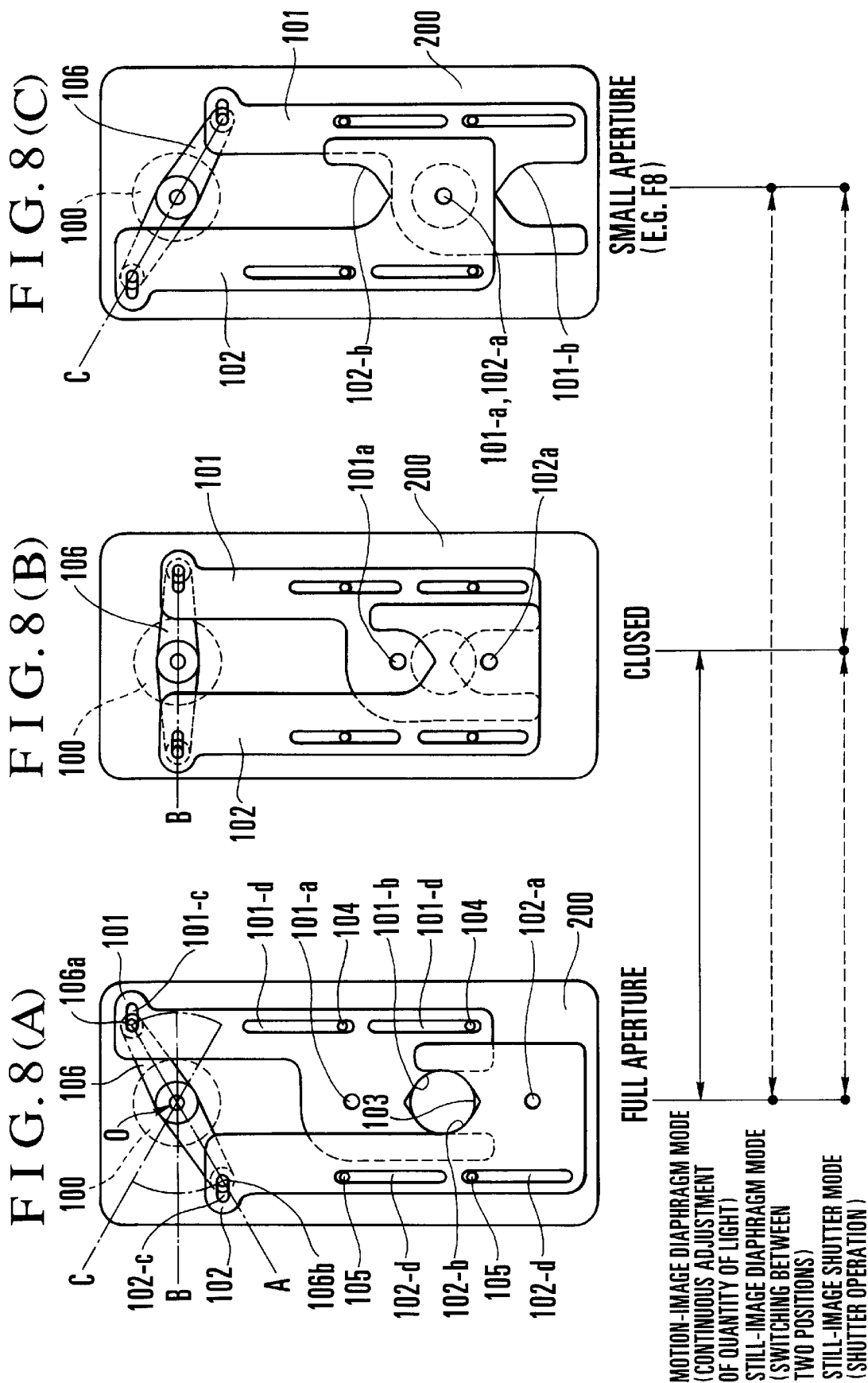
FIGS. 8(A) to 8(C) are diagrams for explaining the action of a quantity-of-light adjusting device according to a third embodiment of the invention.

FIGS. 8(A) to 8(C) show the arrangement of a quantity-of-light adjusting device according to a third embodiment of the invention. The quantity-of-light adjusting device includes a first diaphragm blade 101 and a second diaphragm blade 102. The first and second diaphragm blades 101 and 102 respectively have slots 101-c and 102-c which are fit on shaft parts 106a and 106b formed at end parts of a driving arm 106 which is arranged to swing on a swing shaft 0. Further, the first and second diaphragm blades 101 and 102 respectively have guide slots 101-d and 102-b which are fit on guide pins 104 and 105 formed on a base plate 200. When the driving arm 106 is driven to swing on the swing shaft 0 by an actuator 100 such as a motor or the like, the first and second diaphragm blades 101 and 102 are caused to move upward or downward, as viewed in FIG. 8(A), while being guided by the guide pins 104 and 105.

Further, the first and second diaphragm blades 101 and 102 are respectively provided with continuously-variable aperture parts 101-b and 102-b for enabling continuous aperture adjustment between a full-aperture position and a full-closed position, and fixed-aperture parts 101-a and 102-a for obtaining specific aperture diameters. Reference numeral 103 denotes an opening formed in the base plate 200. The opening 103 determines the full-aperture diameter of the quantity-of-light adjusting device.

The quantity-of-light adjusting device which is arranged as described above operates as follows. When the driving arm 106 swings to an angle position A which is one end of its swinging range, as shown in FIG. 8(A), the two diaphragm blades 101 and 102 are brought to the full-open positions to bring about a state in which a light flux passing through the opening 103 is completely unblocked by the continuously-variable aperture parts 101-b and 102-b.

When the driving arm 106 swings to an angle position B, as shown in FIG. 8(B), the two diaphragm blades 101 and 102 are brought to the full-closed positions to bring about a state in which a light flux passing through the opening 103 is completely blocked by the continuously-variable aperture parts 101-b and 102-b.

Further, when the driving arm 106 swings to an angle position C which is the other end of the swinging range, as shown in FIG. 8(C), the fixed-aperture parts 101-a and 102-a of the diaphragm blades 101 and 102 come to coincide with each other on the opening 103, thereby giving a specific aperture diameter.

In the third embodiment, when the driving arm 106 is driven to continuously move between the angle positions A and B, the aperture diameter defined by the continuously-variable aperture parts 101-b and 102-b of the two diaphragm blades 101 and 102 can be continuously changed.

Further, when the position of the driving arm 106 is switched between the two positions, i.e., the angle position A and the angle position C, the full aperture formed by the continuously-variable aperture parts 101-b and 102-b of the diaphragm blades 101 and 102 and the fixed aperture formed by the fixed-aperture parts 101-a and 102-a can be changed from one over to the other.

Therefore, in a case where the quantity-of-light adjusting device is mounted on a camera which is capable of taking both motion images and still images, the quantity of light incident on the image sensor, etc., can be adjusted by continuously driving the driving arm 106 between the angle positions A and B (a motion-image diaphragm mode) when the camera is in a motion-image taking mode, and by switching the position of the driving arm 106 between the angle positions A and C (a still-image diaphragm mode) when the camera is in a still-image taking mode.

With the two position switch-over control over the driving arm 106 arranged to drive the driving arm 106 from the angle position A or C to the angle position B (a still-image shutter mode), the full-aperture state or the specific-aperture state can be changed at once over to the full-closed state as a shutter action. Therefore, the quantity-of-light adjusting device can be used as a shutter in the still-image taking mode.

Figure 9:
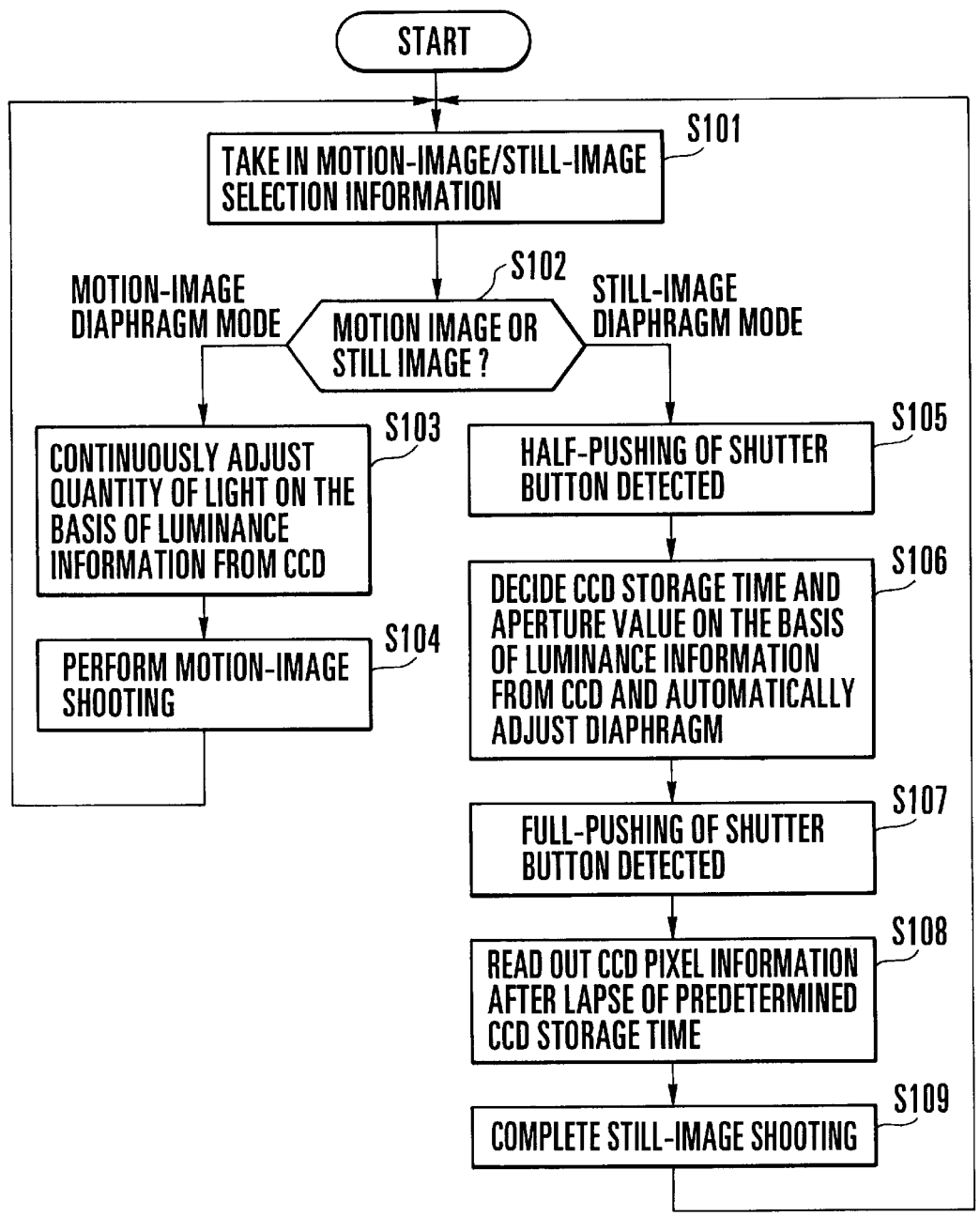
FIG. 9 is a flow chart showing an operation of a camera (having a CCD of the all-pixels read-out type) equipped with the quantity-of-light adjusting device according to the third embodiment.

An operation of a camera which is capable of taking both motion images and still images and is equipped with the quantity-of-light adjusting device according to the third embodiment is next described with reference to FIG. 9 which is a flow chart. The camera is provided with a CCD of the all-pixels read-out type. The flow chart of FIG. 9 then shows the operation both in the motion-image diaphragm mode and the still-image diaphragm mode (the two-position switch-over operation).

As a step S101, information about which of the motion-image taking mode or the still-image taking mode is selected for shooting to be made from now is taken in. At a step S102, a discrimination is made between the motion-image taking mode, i.e., the motion-image diaphragm mode, and the still-image taking mode, i.e., the still-image diaphragm mode. In the case of the motion-image diaphragm mode, the flow of operation proceeds to a step S103. At the step S103, the quantity-of-light adjusting device is caused to continuously adjust the quantity of light on the basis of information on the luminance from the CCD (image sensor). At a step S104, a motion-image taking operation is performed.

On the other hand, in the case of the still-image diaphragm mode, the flow proceeds to a step S105. At the step S105, a shutter button is detected to have been pushed halfway of the full stroke of operation. At the next step S106, the storage time of the CCD and an aperture value are decided on the basis of information on the luminance from the CCD. The aperture of the quantity-of-light adjusting device is thus automatically adjusted. At a step S107, the shutter button is found to have been pushed to the full stroke. At a step S108, after the lapse of the decided storage time of the CCD, the pixel information of the CCD is read out. At a step S109, the still-image taking operation is brought to an end.

Figure 10:
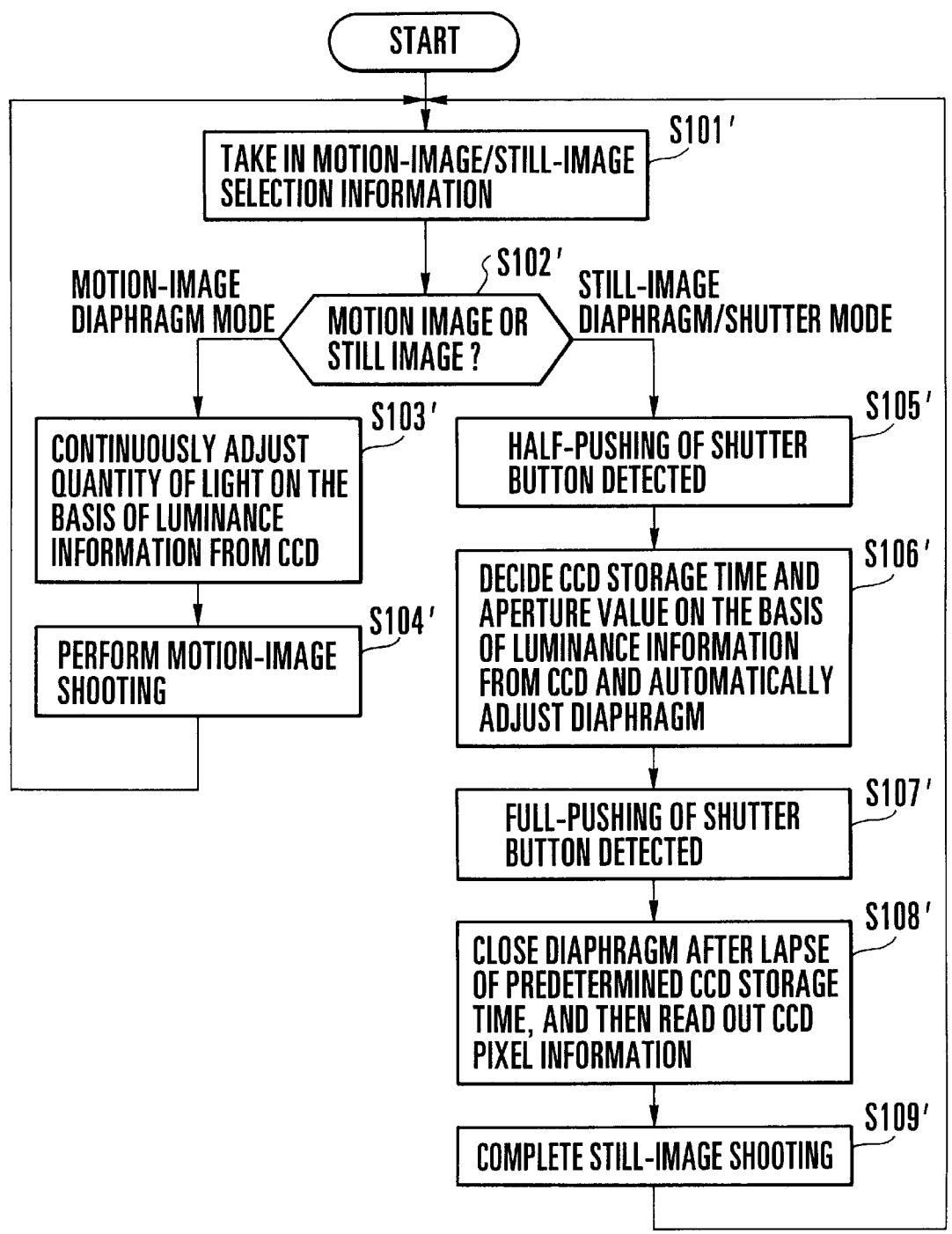
FIG. 10 is a flow chart showing an operation of a camera (having a CCD of the sequential read-out type) equipped with the quantity-of-light adjusting device according to the third embodiment.

FIG. 10 is a flow chart showing an operation of the camera performed in a case where a CCD of the sequential read-out type is employed for the camera. The operation is performed in the motion-image diaphragm mode and the still-image diaphragm/shutter mode (shutter operation).

At a step S101' of FIG. 10, information about which of the motion-image taking mode or the still-image taking mode is selected for shooting to be made from now is taken in. At a step S102', a discrimination is made between the motion-image taking mode, i.e., the motion-image diaphragm mode, and the still-image taking mode, i.e., the still-image diaphragm/shutter mode. In the case of the motion-image diaphragm mode, the flow of operation proceeds to a step S103'. At the step S103', the quantity-of-light adjusting device is caused to continuously adjust the quantity of light on the basis of information on the luminance from the CCD (image sensor). At a step S104', a motion-image taking operation is performed.

On the other hand, in the case of the still-image diaphragm/shutter mode, the flow proceeds to a step S105'. At the step S105', a shutter button is detected to have been pushed halfway of the full stroke of operation. At the next step S106', the storage time of the CCD and an aperture value are decided on the basis of information from the luminance of the CCD. The aperture of the quantity-of-light adjusting device is thus automatically adjusted. At a step S107', the shutter button is found to have been pushed to the full stroke. At a step S108', after the lapse of the decided storage time of the CCD, the aperture of the quantity-of-light adjusting device is closed and the pixel information of the CCD is read out. At a step S109', the still-image taking operation is brought to an end.

Fourth Embodiment

FIG. 11 and FIGS. 12(A) to 12(C) schematically show the arrangement of a quantity-of-light adjusting device according to a fourth embodiment of the invention. Referring to FIG. 11 and FIGS. 12(A) to 12(C), the quantity-of-light adjusting device according to the fourth embodiment includes a stepping motor 201, a lever 202 arranged to transmit a driving force from the stepping motor 201, a frame provided for limiting a driving range of the lever 202, an upper diaphragm blade 204 and a lower diaphragm blade 205 which are driven by the stepping motor 201 via the lever 202, and a diaphragm base plate 207 having formed therein an aperture opening 206 through which a light flux passes.

In the quantity-of-light adjusting device according to the fourth embodiment, when the stepping motor 201 is changed from a non-energized state to an energized state, the stepping motor 201 is driven to an initial operation position (predetermined operation position), which causes the lever 202 to be stopped at a middle position within the frame 203. In this instance, both the diaphragm blades 204 and 205 are driven to a closed position (reference position), in which the aperture opening 206 formed in the diaphragm base plate 207 is fully covered by the diaphragm blades 204 and 205.

Figure 11:
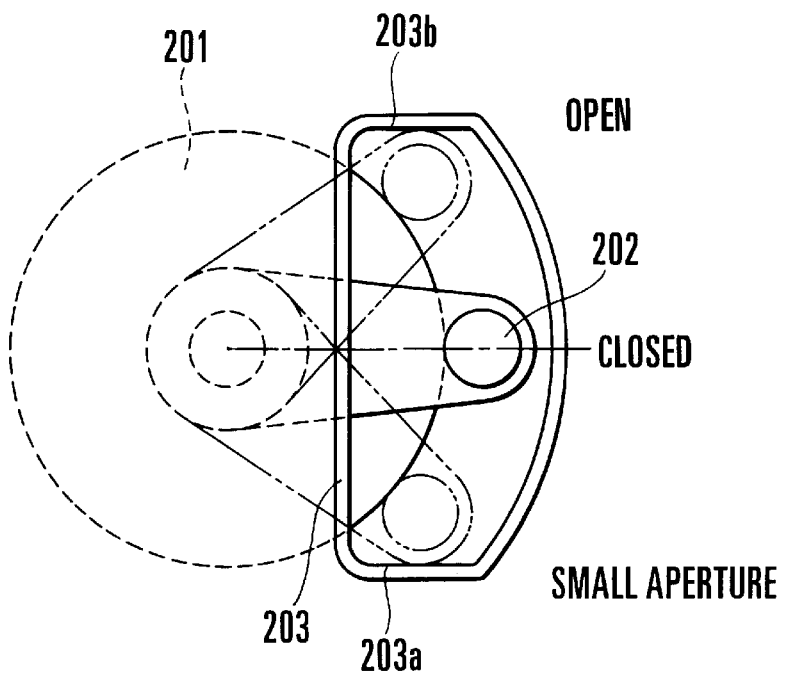
FIG. 11 is a schematic diagram showing the arrangement of a part of a quantity-of-light adjusting device according to a fourth embodiment of the invention.
Figures 12A, 12B, 12C:
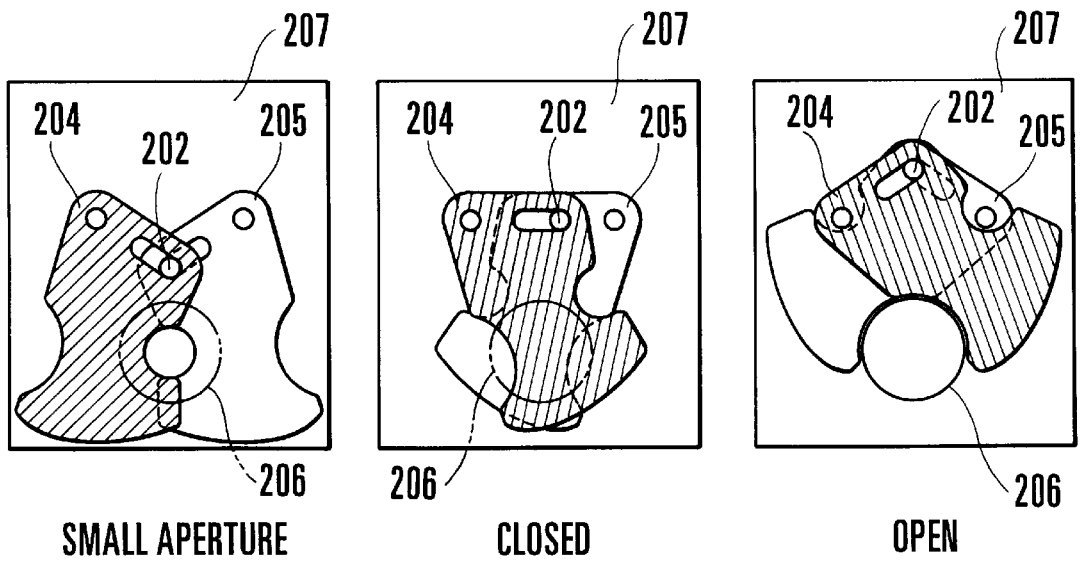
FIGS. 12(A), 12(B) and 12(C) are diagrams for explaining operations of diaphragm blades of the quantity-of-light adjusting device shown in FIG. 11 during a still-image pickup mode.

When the energized state of the stepping motor 201 is changed over so as to drive, for one step in the clockwise direction as viewed in FIG. 11, the stepping motor 201 which has been stopped at the initial operation position, the stepping motor 201 rotates until the lever 202 abuts on one end 203a of the frame 203. According to the rotation of the stepping motor 201, both the diaphragm blades 204 and 205 are driven from the closed position to a small-aperture position, in which the aperture opening 206 is partly covered to realize a small-diameter aperture through which a light flux passes.

Also, when the energized state of the stepping motor 201 is changed over so as to drive, for one step in the counterclockwise direction as viewed in FIG. 11, the stepping motor 201 which has been stopped at the initial operation position, the stepping motor 201 rotates until the lever 202 abuts on the other end 203b of the frame 203. According to the rotation of the stepping motor 201, both the diaphragm blades 204 and 205 are driven from the closed position to an open position (fully-opened aperture position), in which the aperture opening 206 is not covered at all, to realize a full aperture.

Figure 13:
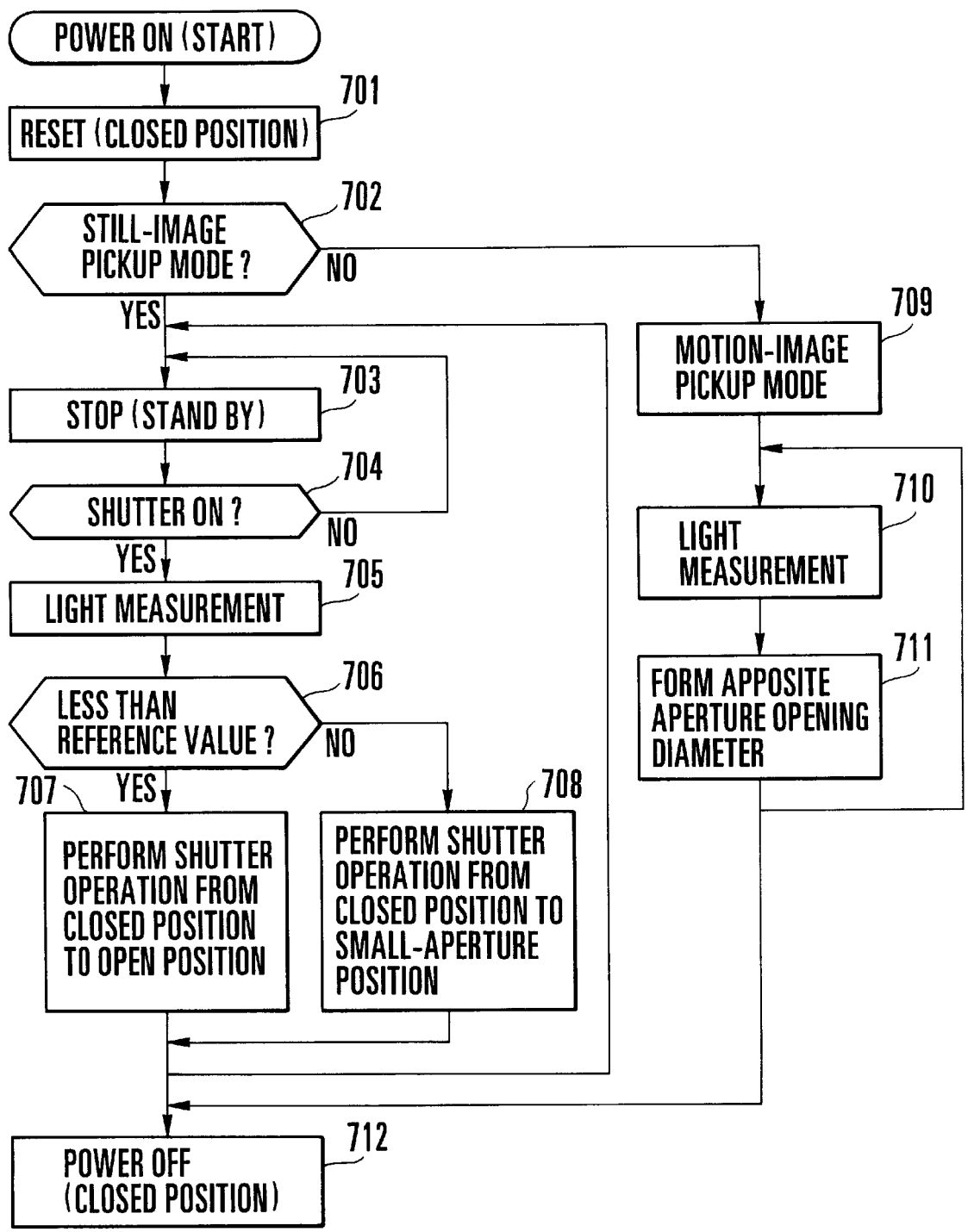
FIG. 13 is a flow chart showing the operation of a camera equipped with the quantity-of-light adjusting device shown in FIG. 11.

In the quantity-of-light adjusting device arranged as described above, the stepping motor 201 is controlled by a microcomputer incorporated in a camera. In the following, a control operation of the microcomputer for the camera including the quantity-of-light adjusting device will be described by reference to the flow chart of FIG. 13.

When a power supply of the camera is turned on, the camera microcomputer gives an instruction to a motor control circuit (not shown) to change the stepping motor 201 from the non-energized state to the energized state. Accordingly, the stepping motor 201 is driven to the above initial operation position, so that both the diaphragm blades 204 and 205 are driven to the closed position (step 701). By this operation, the so-called resetting operation of the quantity-of-light adjusting device is completed. Therefore, it is possible to dispense with an automatic closing spring or member, a sensor for detecting the initial position of a diaphragm blade, or the like, which would be required in the conventional quantity-of-light adjusting device.

Subsequently, the microcomputer makes a check to find whether the operation mode of the camera is set to a still-image pickup mode or to a motion-image pickup mode (step 702). If the operation mode of the camera is set to the still-image pickup mode, the flow of operation stands by with both the diaphragm blades 204 and 205 stopped at the closed position (step 703).

Then, when a release switch of the camera is pushed (turned on) (step 704), the camera microcomputer causes a light measuring device (not shown) to measure the luminance of a picked-up image plane (step 705). Upon receipt of the luminance information from the light measuring device, the camera microcomputer makes a check to find if the luminance information indicates a value less than a predetermined reference value (step 706).

If it is found that the luminance information indicates a value less than the predetermined reference value, in order to obtain an apposite exposure value, the microcomputer causes the motor control circuit to drive the stepping motor 201 for one step in the counterclockwise direction as viewed in FIG. 11, so that the diaphragm blades 204 and 205 are driven to the open position. After that, a shutter operation is performed at an apposite shutter speed to expose an image sensor such as a CCD to light, thereby completing the still-image pickup operation (step 707).

On the other hand, if it is found that the luminance information indicates a value not less than the predetermined reference value, in order to obtain an apposite exposure value, the microcomputer causes the motor control circuit to drive the stepping motor 201 for one step in the clockwise direction as viewed in FIG. 11, so that the diaphragm blades 204 and 205 are driven to the small-aperture position. After that, the shutter operation is performed at an apposite shutter speed, thereby completing the still-image pickup operation (step 708).

Figure 14:
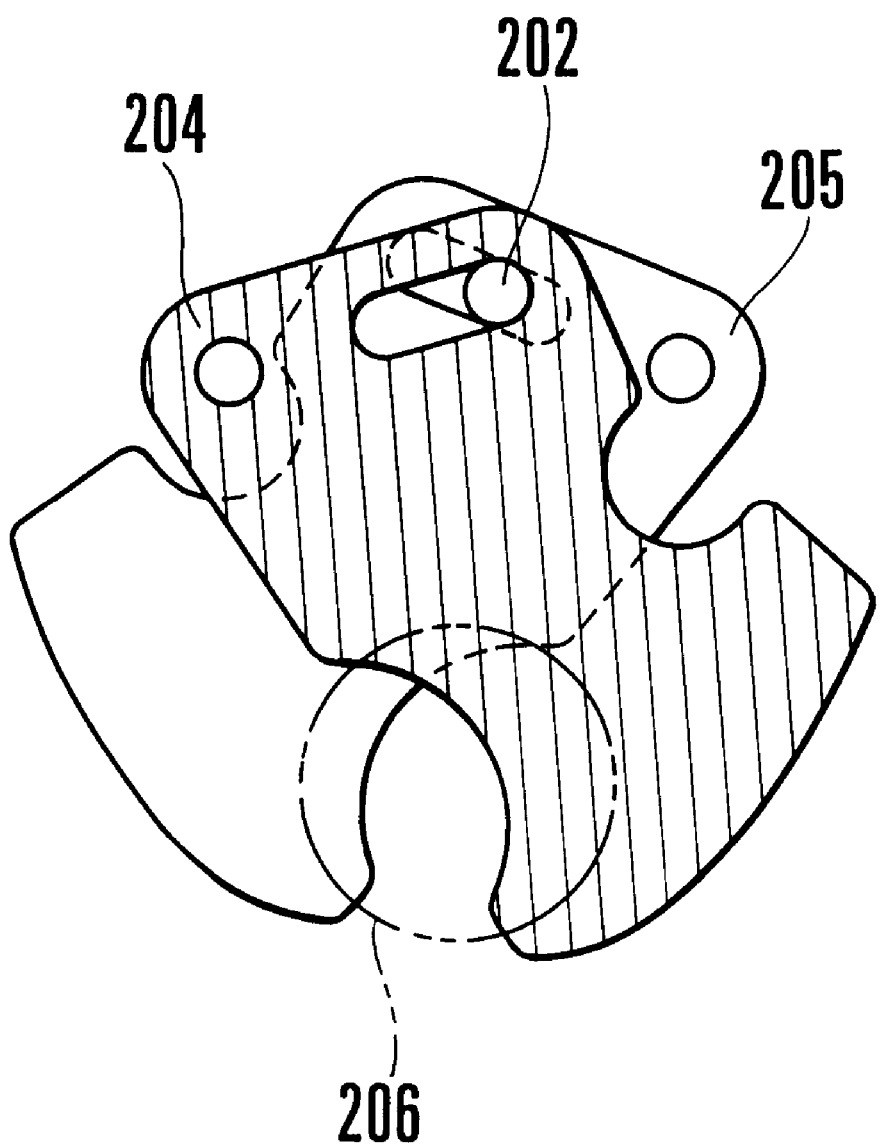
FIG. 14 is a diagram for explaining an operation of the diaphragm blades of the quantity-of-light adjusting device shown in FIG. 11 during a motion-image pickup mode.

Further, if the operation mode of the camera is set to the motion-image pickup mode, a control method of the motor control circuit for the quantity-of-light adjusting device is changed from a control method adapted for the still-image pickup mode to a control method adapted for the motion-image pickup mode (step 709). At the same time, the camera microcomputer causes the light measuring circuit to measure the luminance of a picked-up image plane (step 710). Then, in order to obtain an apposite exposure value, the microcomputer calculates a driving direction and a driving step number of the stepping motor 201 according to a change of the luminance information, and changes over the energized state of the stepping motor 201 through the motor control circuit. By this operation, the diaphragm blades 204 and 205 are controlled in such a way as to form an apposite aperture opening diameter between the open position and the closed position, as shown in FIG. 14, so that the motion-image pickup operation is performed by the image sensor such as a CCD (step 711).

When the still-image or motion-image pickup operation is completed in the above-stated manner and the power supply of the camera is turned off, the microcomputer changes over the energized state of the stepping motor 201 through the motor control circuit to temporarily return the stepping motor 201 to the initial operation position (i.e., to drive the diaphragm blades 204 and 205 to the closed position), and, after that, stops energizing the stepping motor 201 (step 712). Accordingly, it is possible to surely return the diaphragm blades 204 and 205 to the closed position and surely retain them at that position by means of a cogging torque of the stepping motor 201 itself, without necessitating any automatic closing spring or member which would be required in the conventional quantity-of-light adjusting device.

Further, in the fourth embodiment, a description is made of a quantity-of-light adjusting device which is adapted for both the still-image pickup operation and the motion-image pickup operation. However, the invention is applicable to a quantity-of-light adjusting device which is adapted for only one of the still-image pickup operation and the motion-image pickup operation.

Further, the initial position of the stepping motor 201 does not have to be a position corresponding to the closed position of the diaphragm blades 204 and 205, differently from the fourth embodiment.

What is claimed is:

1. A quantity-of-light adjusting device comprising:
   a) a drive source;
   b) a base member having an opening formed therein; and
   c) a blade arranged to move by being driven by said drive source and having three openings formed therein side by side in a row in a moving direction of said blade, wherein, among the three openings formed in said blade, the opening situated in the middle of the row is larger than the opening formed in said base member.

2. A quantity-of-light adjusting device according to claim 1, wherein said base member has a restricting part formed therein to restrict a moving range of said blade by an arm member fixed to said drive source abutting on said restricting part.

3. A quantity-of-light adjusting device according to claim 2, wherein said drive source has a plurality of magnetically stable points.

4. A quantity-of-light adjusting device according to claim 3, wherein said restricting part is located so that said arm member abuts on said restricting part by using a magnetic force of said drive source acting toward one of the magnetically stable points.

5. A quantity-of-light adjusting device according to claim 2, wherein, when said arm member fixed to said derive source abuts on said restricting part, one of two openings situated at two ends of the row, among the three openings formed in said blade, coincides in position with the opening formed in said base member.

6. A quantity-of-light adjusting device according to claim 3, wherein, when said drive source is in a stable state at one of the plurality of magnetically stable points within the moving range of said blade, the opening situated in the middle of the row, among the three openings formed in said blade, coincides in position with the opening formed in said base member.

7. An optical apparatus having a quantity-of-light adjusting device, comprising:
   a) a drive source;
   b) a base member having an opening formed therein; and
   c) a blade arranged to move by being driven by said drive source and having three openings formed therein side by side in a row in a moving direction of said blade, wherein, among the three openings formed in said blade, the opening situated in the middle of the row is larger than the opening formed in said base member.

8. An optical apparatus according to claim 7, wherein said base member has a restricting part formed therein to restrict a moving range of said blade by an arm member fixed to said drive source abutting on said restricting part.

9. An optical apparats according to claim 8, wherein said drive source has a plurality of magnetically stable points.

10. An optical apparatus according to claim 9, wherein said restricting part is located so that said arm member abuts on said restricting part by using a magnetic force of said drive source acting toward one of the magnetically stable points.

11. An optical apparatus according to claim 8, wherein, when said arm member fixed to said drive source abuts on said restricting part, one of two openings situated at two ends of the row, among the three openings formed in said blade, coincides in position with the opening formed in said base member.

12. An optical apparatus according to claim 9, wherein, when said drive source is in a stable state at one of the plurality of magnetically stable points within the moving range of said blade, the opening situated in the middle of the row, among the three openings formed in said blade, coincides in position with the opening formed in said base member.

* * * * *

UNITED STATES PATENT AND TRADEMARK OFFICE
CERTIFICATE OF CORRECTION

PATENT NO. : 6,086,267
DATED : July 11, 2000
INVENTOR(S) : Masahiko Tsuzuki, et al.

It is certified that error appears in the above-identified patent and that said Letters Patent is hereby corrected as shown below:

Column 5,
Line 55, delete "large diameter" and insert -- large-diameter --.

Signed and Sealed this

Twenty-eighth Day of August, 2001

Attest:

*Nicholas P. Godici*

NICHOLAS P. GODICI
*Attesting Officer*     *Acting Director of the United States Patent and Trademark Office*